(12) United States Patent
Kim et al.

(10) Patent No.: US 10,471,950 B2
(45) Date of Patent: Nov. 12, 2019

(54) HYBRID VEHICLE AND METHOD OF CHANGING OPERATION MODE FOR THE SAME

(71) Applicants: Hyundai Motor Company, Seoul (KR); Kia Motors Corporation, Seoul (KR)

(72) Inventors: Sung Deok Kim, Seongnam-si (KR); Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 143 days.

(21) Appl. No.: 15/717,627

(22) Filed: Sep. 27, 2017

(65) Prior Publication Data
US 2018/0170360 A1 Jun. 21, 2018

(30) Foreign Application Priority Data
Dec. 16, 2016 (KR) .......................... 10-2016-0172734

(51) Int. Cl.
*B60W 20/40* (2016.01)
*B60W 20/11* (2016.01)
(Continued)

(52) U.S. Cl.
CPC ............ *B60W 20/40* (2013.01); *B60W 10/06* (2013.01); *B60W 10/08* (2013.01); *B60W 20/11* (2016.01); *B60W 20/12* (2016.01); *B60W 20/16* (2016.01); *B60W 30/192* (2013.01); *B60W 50/0097* (2013.01); *B60W 2510/0676* (2013.01);
(Continued)

(58) Field of Classification Search
CPC .. B60W 20/40; B60W 50/0097; B60W 20/16; B60W 20/12; B60W 30/192; B60W 10/08; B60W 10/06; B60W 20/11; B60W 2550/20; B60W 2530/16; B60W 2520/10; B60W 2550/308; B60W 2550/141; B60W 2530/10; B60W 2520/40; B60W 2710/0688; B60W 2510/0676; B60W 2550/142; Y02T 10/6286; Y10S 903/93
See application file for complete search history.

(56) References Cited

U.S. PATENT DOCUMENTS 8,560,155 B2   10/2013   Kedar-Dongarkar et al.
8,731,752 B2    5/2014   Yu et al.
(Continued)

FOREIGN PATENT DOCUMENTS

JP        3894153 B2    3/2007
JP     2009-012605 A    1/2009
(Continued)

*Primary Examiner* — Thomas Ingram
(74) *Attorney, Agent, or Firm* — Morgan, Lewis & Bockius LLP

(57) ABSTRACT

A method of changing an operation mode of a hybrid vehicle may include determining a current operation mode, determining a predicted travel distance in a first mode when the current operation mode is the first mode or a current driving load satisfies a criterion for switching to the first mode as a result of the determination, determining whether an engine is warmed up, and determining whether to drive in the first mode or a second mode according to the determined predicted travel distance and whether the engine is warmed up.

19 Claims, 5 Drawing Sheets

(51) Int. Cl.
   *B60W 10/06*   (2006.01)
   *B60W 10/08*   (2006.01)
   *B60W 50/00*   (2006.01)
   *B60W 30/192*  (2012.01)
   *B60W 20/12*   (2016.01)
   *B60W 20/16*   (2016.01)

(52) U.S. Cl.
   CPC ..... *B60W 2520/10* (2013.01); *B60W 2520/40* (2013.01); *B60W 2530/10* (2013.01); *B60W 2530/16* (2013.01); *B60W 2550/141* (2013.01); *B60W 2550/142* (2013.01); *B60W 2550/20* (2013.01); *B60W 2550/308* (2013.01); *B60W 2710/0688* (2013.01); *Y02T 10/6286* (2013.01); *Y10S 903/93* (2013.01)

(56) References Cited

U.S. PATENT DOCUMENTS

| | | | |
|---|---|---|---|
| 8,774,993 B2 * | 7/2014 | Harada | B60K 6/365 701/22 |
| 9,132,833 B2 * | 9/2015 | Hokoi | B60W 20/40 |

FOREIGN PATENT DOCUMENTS

| | | |
|---|---|---|
| JP | 2010-064499 A | 3/2010 |
| JP | 2014-080190 A | 5/2014 |
| JP | 2015-168322 A | 9/2015 |
| JP | 2016-088128 A | 5/2016 |
| KR | 10-1519789 B1 | 5/2015 |
| KR | 10-1646131 B1 | 8/2015 |
| KR | 10-2016-0071989 A | 6/2016 |

* cited by examiner

HYBRID VEHICLE AND METHOD OF CHANGING OPERATION MODE FOR THE SAME

The present application claims priority to Korean Patent Application No. 10-2016-0172734, filed on Dec. 16, 2016, the entire contents of which is incorporated herein for all purposes by this reference.

BACKGROUND OF THE INVENTION

Field of the Invention

The present invention relates to a hybrid vehicle and a method of changing an operation mode for the same, and more particularly, to a hybrid vehicle configured for changing an operation mode related to variation in a charge of the battery in consideration of preheating of the engine, and a control method for the same.

Discussion of the Related Art

A hybrid electric vehicle (HEV) generally refers to a vehicle that uses two power sources together. The two power sources are mainly an engine and an electric motor. HEVs are recently under vigorous development since HEVs are superior to vehicles provided with an internal combustion engine in terms of fuel efficiency, power performance, and exhaust gas reduction.

The HEV is capable of operating in two modes depending on which powertrain is driven. One of the modes is an electric vehicle (EV) mode in which the HEV runs using only the electric motor, and the other mode is a hybrid electric vehicle (HEV) mode in which the electric motor and the engine are operated together to obtain power. The HEV switches between the two modes according to operation conditions.

In particular, in the case of a plug-in hybrid vehicle (PHEV), in addition to classification of the operation modes according to the powertrain described above, the operation modes may also be divided into a charge depleting (CD) mode and a charge sustaining (CS) mode based on change in the state of charge (SOC) of the battery. Generally, in the CD mode, the electric motor is driven by the electric power of the battery without the power of the engine to operate the vehicle. In the CS mode, the power of the engine is used, and wherein the battery SOC is not lowered.

In the case of a typical PHEV, the vehicle travels in the CD mode regardless of the operation conditions such as the driving load, the possibility of charging, and the distance to the destination, and then switches to the CS mode according to exhaustion of the SOC. The present case will be described with respect to FIG. 1.

FIG. 1 illustrates an example of mode switch performed in a typical PHEV.

In FIG. 1, the horizontal axis represents distance, the vertical axis of the upper graph represents the state of charge (SOC) of the battery of the PHEV, and the vertical axis of the lower graph represents driving load.

First, the lower graph of FIG. 1 depicts a route having cities, a national highway, and an expressway between the place of departure and the destination. The driving load on the route is the highest on the highway, and is higher on national highways than in cities. In running on the present route, the typical PHEV departs a place in the CD mode without considering variation in driving load, and switches to the CS mode when the SOC falls below a preset reference.

The CD mode exhibits relatively favorable efficiency in low-speed/low-load driving, and the CS mode exhibits relatively favorable efficiency in high-speed/high-load driving. Therefore, when the mode switching is performed based only on the SOC value as described above, the efficiency may be greatly lowered depending on the route because the driving load is not considered.

To address the present issue, an adaptive mode switching (adaptive CD/CS) method may be considered. The adaptive mode switching method involves automatically switching between the CD/CS modes according to the optimum efficiency using the Distance Until Charge (DUC), which is the travel distance until a next charge, the Drive To Empty (DTE), which is a travelable distance in the EV mode, an operation condition, navigation information, and the like when the vehicle travels longer than the All Electric Range (AER), which is the distance which the vehicle can travel using only the electric motor.

For example, when the adaptive mode switching method is applied, the vehicle may travel in the CS mode if the current driving load is greater than a predetermined value based on the operation condition, and travel in the CD mode if the driving load is low. Of course, if DUC≤DTE in a section where the driving load is higher than a predetermined value, the vehicle may be caused to exhaust the SOC in the DUC by operating in the CD mode. The present adaptive mode switching method will be described with respect to FIG. 2.

FIG. 2 illustrates an example of mode switch performed in a typical PHEV when an adaptive mode switching method is applied.

In FIG. 2, the meanings of the horizontal and vertical axes and the route configuration are assumed to be the same as in FIG. 1.

Referring to FIG. 2, the vehicle operates in the CD mode at startup. However, when the vehicle enters a section (the expressway in the figure) in which the driving load exceeds a preset driving load, the vehicle mode is switched to the CS mode even if the SOC is greater than or equal to a predetermined value. In a section in which DUC≤DTE, the vehicle may switch back to the CD mode, enabling efficient driving.

Once the vehicle starts traveling in the CD mode, the vehicle travels without the engine started until the mode is switched to the CS mode. Accordingly, the engine is in a cooled state at the time of switching to the CS mode. Therefore, if the power of the engine is immediately used, it is difficult to satisfy exhaust gas regulations because the temperature of the catalyst of the engine catalytic converter is low. To satisfy exhaust gas regulations, the vehicle uses the engine after performing engine warmup control to raise the temperature of the catalytic converter to the normal operating temperature. The present operation will be described with respect to FIG. 3.

FIG. 3 illustrates an example of engine warmup performed when mode switch is performed in a typical PHEV. Referring to FIG. 3, the PHEV that is configured to perform mode switch based on the SOC is configured to perform warmup control once when switching from the CD mode to the CS mode.

However, in the adaptive mode switching method, switching between modes may be repeated several times according to the operation condition, and the CS travel distance is also variable according to the driving route. Therefore, when the mode is switched from the CD mode to the CS mode, catalyst heating, namely engine warmup control, is performed to satisfy exhaust gas regulations. However, when the vehicle switches to the CD mode immediately after the short CS mode driving, fuel efficiency deteriorates due to fuel exhausted for warmup. Further, when the CS mode is re-entered after the vehicle switches from the CS mode to the CD mode, it is difficult for the vehicle to recognize the catalyst temperature. Accordingly, if the engine warmup is unconditionally performed despite the sufficiently high temperature of the catalyst when the CS mode is entered, the fuel may be wasted.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hybrid vehicle and a method of changing an operation mode for the same that substantially obviate one or more problems due to limitations and disadvantages of the related art.

Various aspects of the present invention are directed to providing a method of more efficiently controlling mode switch in a hybrid vehicle and a vehicle for performing the same.

Various aspects of the present invention intend to provide a method of changing an operation mode taking into consideration the efficiency for warmup of an engine, and a vehicle for performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of changing an operation mode of a hybrid vehicle may include: determining a current operation mode, determining a predicted travel distance in a first mode when the current operation mode is the first mode or a current driving load satisfies a criterion for switching to the first mode as a result of the determination, determining whether an engine is warmed up, and determining whether to drive in the first mode or a second mode according to the determined predicted travel distance and whether the engine is warmed up.

In another aspect of the present invention, a hybrid vehicle may include: an engine, and a hybrid controller configured to determine a predicted travel distance in a first mode and whether the engine is warmed up when a current operation mode is the first mode or a current driving load satisfies a criterion for switching to the first mode, and to determine whether to drive in the first mode or a second mode according to the determined predicted travel distance and whether the engine is warmed up.

It is to be understood that both the foregoing general description and the following detailed description of the present invention are exemplary and explanatory and are intended to provide further explanation of the invention as claimed.

The methods and apparatuses of the present invention have other features and advantages which will be apparent from or are set forth in more detail in the accompanying drawings, which are incorporated wherein, and the following Detailed Description, which together serve to explain predetermined principles of the present invention.

Figure 1:
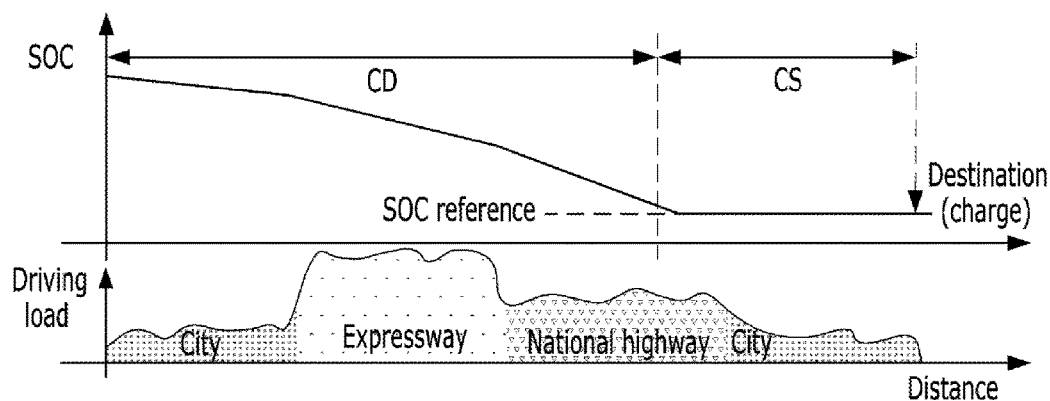
FIG. 1 illustrates an example of mode switch performed in a typical PHEV.
Figure 2:
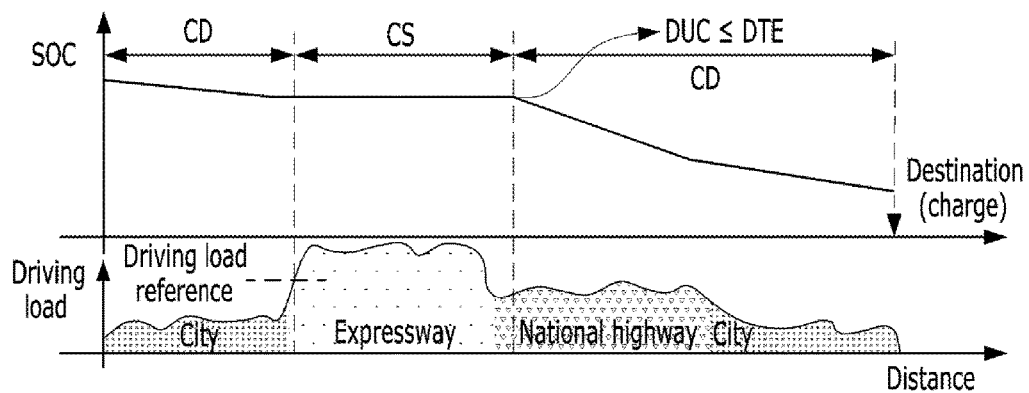
FIG. 2 illustrates an example of mode switch performed in a typical PHEV when an adaptive mode switching method is applied.
Figure 3:
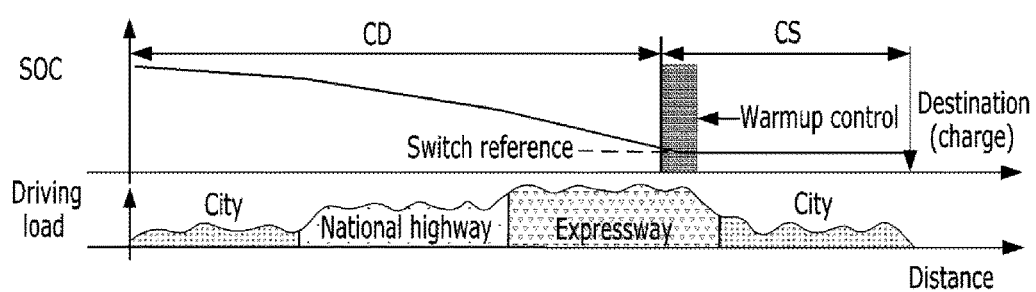
FIG. 3 illustrates an example of engine warmup performed when mode switch is performed in a typical PHEV.

It may be understood that the appended drawings are not necessarily to scale, presenting a somewhat simplified representation of features illustrative of the basic principles of the invention. The predetermined design features of the present invention as disclosed wherein, including, for example, predetermined dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts. As used herein, the suffixes "module" and "unit" are added or used interchangeably to simply facilitate preparation of the present specification and are not intended to suggest meanings or functions distinguished therebetween.

Hereinafter, a hybrid vehicle structure to which embodiments of the present invention may be applied will be described with respect to FIG. 4.

Figure 4:
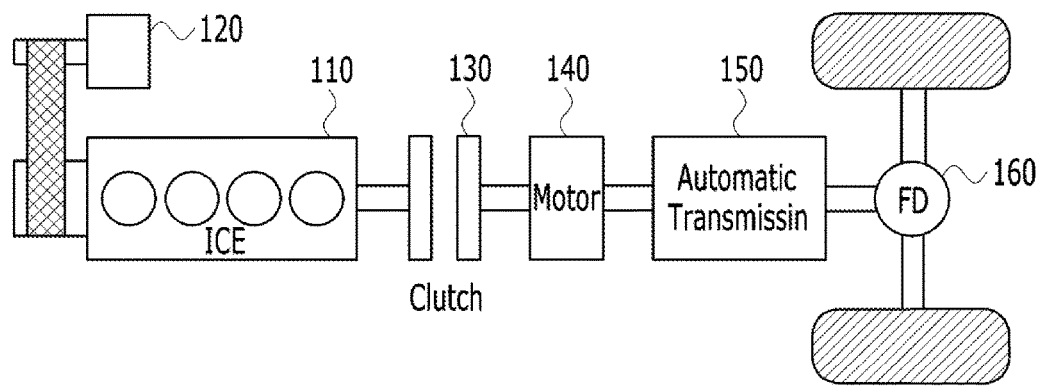
FIG. 4 illustrates a powertrain structure of a hybrid vehicle to which embodiments of the present invention may be applied.

FIG. 4 illustrates a powertrain structure of a hybrid vehicle to which embodiments of the present invention may be applied.

FIG. 4 shows the powertrain of a hybrid vehicle employing a parallel type hybrid system having an electric motor (or drive motor) 140 and an engine clutch 130 which are mounted between an internal combustion engine (ICE) 110 and a transmission 150.

Generally, in such a vehicle, when the driver steps on the accelerator after startup, the motor 140 is first driven using the power of the battery with the engine clutch 130 open, and the power of the motor moves the wheels via the transmission 150 and a final drive (FD) 160 (i.e., in the EV mode). When a larger driving force is required as the vehicle gradually speeds up, a secondary motor (or starter/generator motor) 120 may be operated to drive the engine 110.

Accordingly, when the rotation speeds of the engine 110 and the motor 140 become equal to each other, the engine clutch 130 is engaged, and wherein the engine 110 and the motor 140 together drive the vehicle (i.e., transition from the EV mode to the HEV mode). When a predetermined engine off condition including deceleration of the vehicle, is satisfied, the engine clutch 130 is open and the engine 110 is stopped (i.e., transition from the HEV mode to the EV mode). As such, the vehicle uses the driving force of the wheel to charge the battery through the motor, which is called braking energy regeneration or regenerative braking. Therefore, the starter/generator motor 120 functions as a starter motor when the engine is started, and operates as a generator when the rotational energy of the engine is collected after the engine is started or turned off. Therefore, the starter/generator motor 120 may be referred to as a hybrid starter generator (HSG).

A correlation between controllers in the vehicle to which the powertrain described above is applied is shown in FIG. 5.

Figure 5:
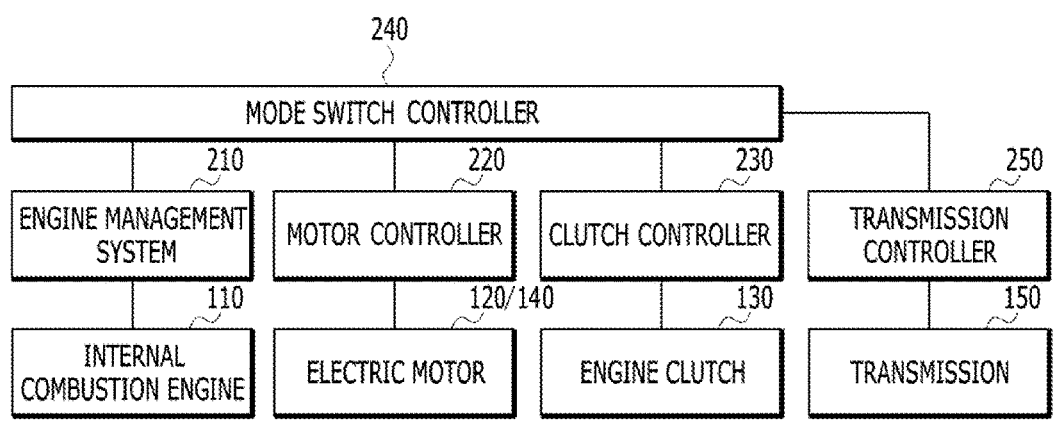
FIG. 5 is a block diagram illustrating an exemplary control system of a hybrid vehicle to which embodiments of the present invention may be applied.

FIG. 5 is a block diagram illustrating an exemplary control system of a hybrid vehicle to which embodiments of the present invention may be applied.

Referring to FIG. 5, in a hybrid vehicle to which embodiments of the present invention may be applied, the internal combustion engine 110 may be controlled by an engine management system (EMS) 210, and the torque of the starter/generator motor 120 and/or motor 140 may be controlled by a motor control unit (MCU) 220. The engine clutch 130 may be controlled by a clutch controller 230. Here, the engine management system (EMS) 210 is also called an engine controller. In addition, the transmission 150 is controlled by a transmission controller 250.

Each controller is connected to a mode switch controller (or hybrid control unit) 240, which is a upper-level controller that is configured to control the entire mode switch processes, and may be controlled by the mode switch controller 240 to provide information necessary for change of the operation mode and control of the engine clutch for gearshift and/or information necessary for engine stop control to the mode switch controller 240 or may perform an operation according to a control signal.

The mode switch controller 240 determines whether to perform the mode switch operation based on the operation state of the vehicle. For example, the mode switch controller is configured to determine the time to open the engine clutch 130. When the engine clutch (EC) 130 is open, the mode switch controller 240 is configured to perform hydraulic control (in a case of the wet EC) or torque capacity control (in a case of the dry EC). Further, the mode switch controller 240 may determine the state of the EC (Lock-up, Slip, Open, etc.) and control the fuel injection stop time of the engine 110. In addition, the mode switch controller may control the torque of the starter/generator motor 120 to control recovery of the rotational energy of the engine to control engine stop. In addition, in adaptive mode switch control, the mode switch controller 240 may determine the mode change condition and control a lower controller to perform the mode switch operation.

Of course, it is apparent to those skilled in the art that the connection relation between the controllers and the functions/division of the controllers described above are illustrative and not limited to the names thereof. For example, the mode switch controller 240 may be implemented, and wherein the corresponding function is provided in any one of the other controllers or that the corresponding function is distributed to and provided by two or more of the other controllers.

Hereinafter, a more efficient mode switch control method according to an exemplary embodiment of the present invention will be described based on the vehicle structure described above.

As described above, in the typical adaptive mode switching method, ineffective control that causes engine warmup every time the CS mode in which the engine is used is entered may occur in a situation where switch between the modes (from the CD to the CS mode and vice versa) may frequently occur according to the operation condition. To prevent ineffective control, it is provided in the present exemplary embodiment that the predicted CS mode travel distance be determined at the time of determination of switching from the CD mode to the CS mode in the vehicle, and the engine warmup control be performed in consideration of the fuel efficiency and the system efficiency based on the determination.

That is, in the exemplary embodiment of the present invention, the future CS mode travel distance may be predicted using the current state (i.e., temperature) of the engine and the frond road information acquired through the navigation device in the vehicle. As such, the CD mode may be maintained to prevent unnecessary engine warmup when the predicted distance is short. When the predicted distance is long, the vehicle may be driven in the CS mode after warmup of the engine. In addition, to determine the state of the engine, the temperature of the catalytic converter is estimated by applying the temperature modeling of the engine. When the catalyst is sufficiently heated at the estimated temperature, switching to the CS mode may be immediately performed even when the predicted CS mode travel distance is short. Accordingly, system efficiency may be improved.

Hereinafter, a method of determining the predicted CS mode travel distance according to the present exemplary embodiment will be described.

The hybrid controller is configured to determine the predicted CS mode travel distance based on the type, length, gradient, and congestion information related to the front road from the navigation device during the adaptive mode switch (adaptive CD/CS) control.

The predicted CS mode travel distance (hereinafter referred to as "$CS_{pred}$" for simplicity) may be determined through a function considering at least one of the type, length, gradient, and congestion information related to the front road. For example, the method of obtaining $CS_{pred}$ may be expressed as follows.

$$CS_{pred} = f(\text{front road type, length, gradient, congestion information})$$

Next, the engine temperature modeling for determining whether or not to warm up the engine according to the present exemplary embodiment will be described.

The reason for introducing the modeling in the present exemplary embodiment is that a typical vehicle engine is not provided with a detector for directly measuring the catalyst temperature in the catalytic converter. Of course, when a temperature detector is provided in the catalytic converter, a detected value may be directly used instead of the temperature modeling.

The temperature of the catalytic converter (hereinafter, referred to as "$Cat_{temp}$" for simplicity) may be estimated by estimating the temperature of the catalytic converter based on the engine coolant temperature and the vehicle speed and taking into account decrease in catalyst temperature after the engine is stopped. For example, the method of obtaining $Cat_{temp}$ may be expressed as follows.

$$Cat_{temp} = f(\text{coolant temperature, vehicle speed, time after engine stop})$$

In the adaptive mode switch control using $CS_{pred}$ and $Cat_{temp}$, the engine warmup control method according to the present exemplary embodiment is implemented as follows.

Using the values of $CS_{pred}$ and $Cat_{temp}$ in addition to the mode switch criterion according to the existing typical driving load conditions as mode switch criteria, whether to switch to the CS mode may be determined by three control types according to four cases as follows.

Case 1: $CS_{pred}$<predetermined value, $Cat_{temp}$<predetermined value
  Control type 1: Switching to the CS mode is prohibited, and the CD mode is maintained. This means that the predicted CS mode travel distance is shorter than a predetermined distance and the engine is not warmed up. Therefore, there is a high possibility of switching to the CD mode immediately after warmup of the engine, and thus unnecessary warmup is prevented.
Case 2: $CS_{pred}$>predetermined value, $Cat_{temp}$<predetermined value
  Control type 2: In the instant case, the predicted CS mode travel distance is long enough, while the engine warmup is required. Accordingly, the fuel is consumed for warmup control, but efficiency degradation is not significant. Therefore, the CS mode may be entered through warmup control.
Case 3: $CS_{pred}$<predetermined value, $Cat_{temp}$>predetermined value, Case 4: $CS_{pred}$>predetermined value, $Cat_{temp}$>predetermined value
  Control type 3: In both cases, the engine is already warmed up, and thus switching to the CS mode does not require the warmup operation. Therefore, the mode is immediately switched to the CS mode according to the driving load without the engine warmup control.

Hereinafter, the mode switch control and the corresponding engine warmup control method will be described with respect to the flowchart of FIG. 6.

Figure 6:
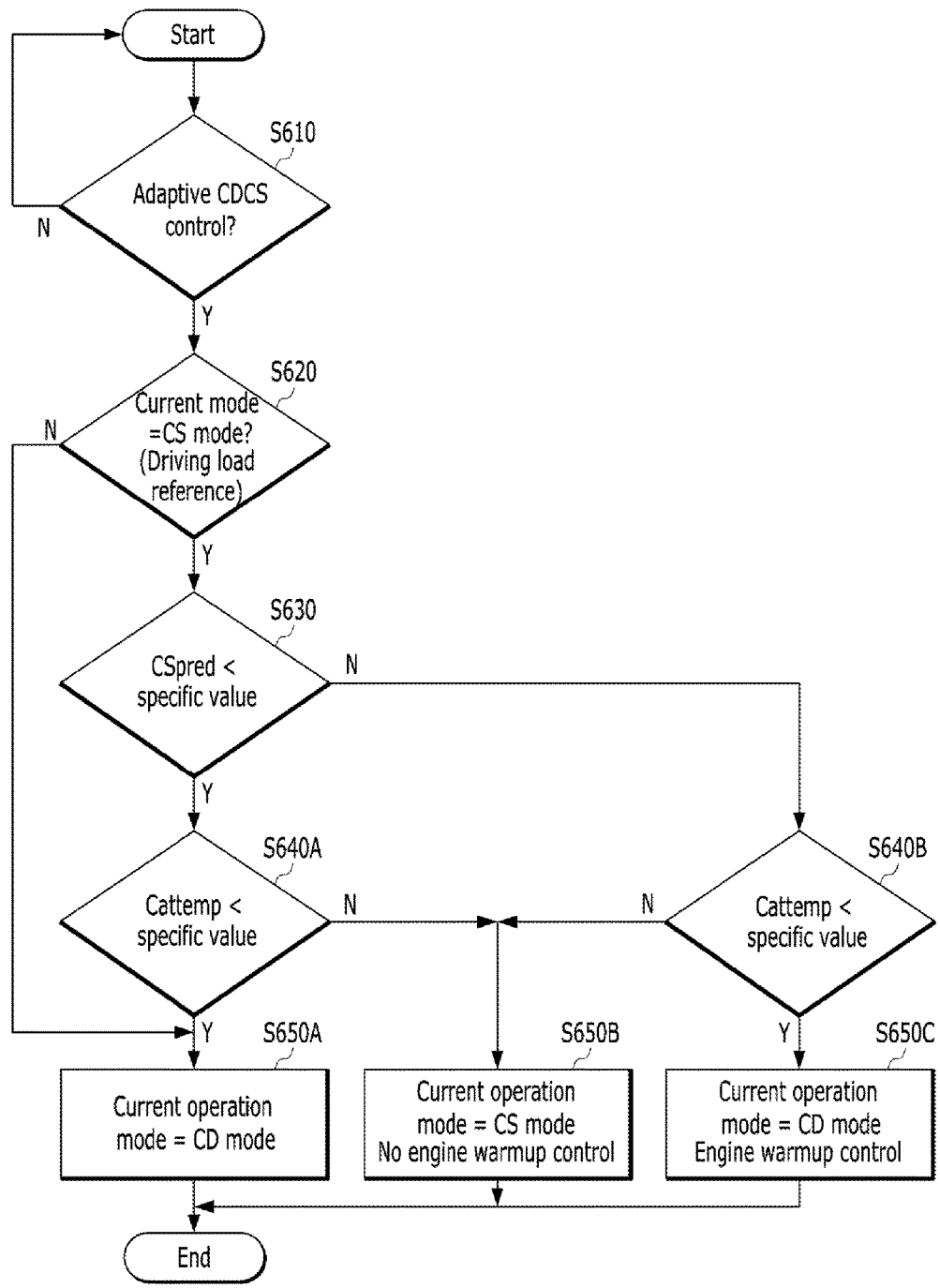
FIG. 6 is a flowchart illustrating an exemplary procedure of adaptive mode switch control according to an exemplary embodiment of the present invention.

FIG. 6 is a flowchart illustrating an exemplary process of adaptive mode switch control according to an exemplary embodiment of the present invention.

FIG. 6 is a flowchart illustrating an exemplary process of determining an auxiliary motor torque according to an exemplary embodiment of the present invention.

Referring to FIG. 6, adaptive mode switch (adaptive CDCS) control may be initiated first (S610). Initiation of the present control may be performed according to conditions including the driver's mode setting, adoption of the mode of the hybrid controller according to satisfaction of a predetermined condition, default setting of the hybrid controller, and destination input to the navigation device, but embodiments of the present invention are not limited thereto.

During the adaptive mode switch control, the hybrid controller is configured to determine the current mode based on an driving load reference. As a result of the determination, when the current mode is the CS mode or it is necessary to switch to the CS mode (S620), the hybrid controller may acquire the value of $CS_{pred}$ and the value of $Cat_{temp}$ and compare the same with predetermined reference values (S630, S640A, S640B).

Here, the driving load reference may mean that the driving load estimated by the combination of the vehicle speed, the required torque, and the load level is set as a primary criterion for switch to the CS mode, while in the case of DUC≤DTE, a control operation causing the SOC to be exhausted within the DUC through the CD mode driving may be additionally performed. The DUC may be estimated by utilizing past information on the vehicle or the navigation destination.

The predetermined values may be set differently depending on the powertrain configuration including the motor output power, the battery capacity, and the engine characteristics for each of the values of $CS_{pred}$ and $Cat_{temp}$.

As a result of the determination, when $CS_{pred}$<predetermined value and $Cat_{temp}$<predetermined value, the hybrid controller may determine to drive in the CD mode (S650A).

Alternatively, when $CS_{pred}$<predetermined value and $Cat_{temp}$>predetermined value, or when $CS_{pred}$>predetermined value and $Cat_{temp}$>predetermined value, the hybrid controller may determine to drive in the CS mode without engine warmup control (S650B).

Alternatively, when $CS_{pred}$>predetermined value and $Cat_{temp}$<predetermined value as a result of the determination, the hybrid controller may determine to drive in the CS mode along with the engine warmup control (S650C).

Hereinafter, a predetermined embodiment of performing the mode switch control and the corresponding engine warmup control method will be described with respect to FIG. 7.

Figure 7:
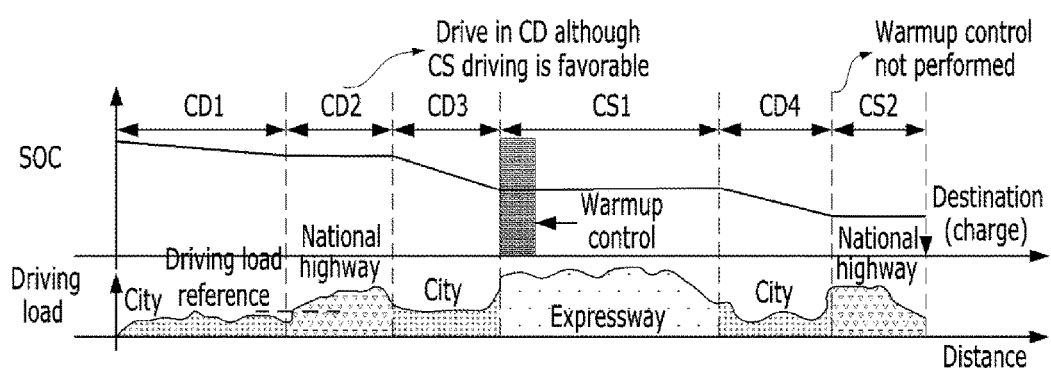
FIG. 7 illustrates mode switch for each driving load that occurs when adaptive mode switch is controlled according to an exemplary embodiment of the present invention.

FIG. 7 illustrates mode switch for each driving load that occurs when adaptive mode switch is controlled according to an exemplary embodiment of the present invention.

Referring to FIG. 7, the adaptive mode switch control is applied to the hybrid vehicle according to the exemplary embodiment of the present invention, and the vehicle is driven in the CD mode in the city section (section CD 1) since the driving load is less than the CS mode switch reference at the start of driving in the city.

Thereafter, the vehicle enters a national highway on which the driving load exceeds the CS mode switch reference, and the hybrid controller compares the value of $CS_{pred}$ value and the value of $Cat_{temp}$ with the predetermined values. Since the national highway section is relatively short and is immediately followed by a city section where the driving load is low (i.e., $CS_{pred}$<predetermined value), and the vehicle travels in the CD mode from the beginning without the engine warmed up (i.e., $Cat_{temp}$<predetermined value), the hybrid controller may determine to travel on the national highway section in the CD mode (section CD 2), although CS travel is favorable in terms of driving load.

In a next city section (section CD 3), the CD mode is maintained because the driving load is low.

Thereafter, since the driving load reference is high on the highway, the hybrid controller is configured to determine whether or not to switch modes. As such, the hybrid controller switches to the CS mode along with engine warmup control because the highway section is sufficiently long (i.e., $CS_{pred}$>predetermined value) even though the engine has not been warmed up ($Cat_{temp}$<predetermined value) (section CS 1).

After the highway section ends, a city section in which the driving load is low appears to be, and the hybrid controller is configured to determine to switch to the CD mode (section CD 4).

Thereafter, when a national highway section that cause a high driving load but is relatively short (i.e., $CS_{pred}$>predetermined value), the hybrid controller switches to the CS mode without engine warmup control when the catalyst has not cooled yet (i.e., $Cat_{temp}$>predetermined value) (section CS 2).

The present invention described above may be implemented as a computer-readable code on a medium on which a program is recorded. The computer-readable medium includes all kinds of recording devices in which data that may be read by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage device.

As apparent from the above description, the present invention has effects as follows.

A hybrid vehicle related to at least one exemplary embodiment of the present invention configured as described above may more efficiently control mode switch.

Particularly, in controlling adaptive mode switch, unnecessary engine warmup may be prevented, and fuel efficiency on the actual road may be improved.

It will be appreciated by those skilled in the art that the effects that can be achieved with the present invention are not limited to what has been described above and other effects of the present invention will be clearly understood from For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with respect to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to be configured for others skilled in the art to make and utilize exemplary embodiments of the present invention, as well as alternatives and modifications thereof. It is intended that the scope of the invention be defined by the Claims appended hereto and their equivalents.

What is claimed is:

1. A method of changing an operation mode of a vehicle, the method comprising:
    determining, by a controller, a current operation mode;
    determining, by the controller, a predicted travel distance in a first mode when the current operation mode is the first mode or a current driving load satisfies a criterion for switching to the first mode as a result of the determination;
    determining, by the controller, whether an engine is warmed up; and
    determining, by the controller, whether to drive in the first mode or a second mode according to the determined predicted travel distance and whether the engine is warmed up; and
    controlling, by the controller, the vehicle to drive in the first mode or the second mode based on the determined predicted travel distance and on determination of whether the engine is warmed up.

2. The method according to claim 1, wherein the current driving load is determined through at least one of a speed of the vehicle, a required torque, and a load level.

3. The method according to claim 1, wherein the predicted travel distance is determined through at least one of a type of a front road, a length of the front road, a gradient of the front road, and congestion information.

4. The method according to claim 1, wherein whether the engine is warmed up is determined using a catalyst temperature of an exhaust gas catalytic converter.

5. The method according to claim 4, wherein the catalyst temperature is determined using at least one of a temperature of a coolant, a speed of the vehicle, and an elapsed time since the engine stops.

6. The method according to claim 1, wherein the determining of whether to drive in the first mode or the second mode includes:
    determining to drive in the second mode when the predicted travel distance is less than a predetermined value and the engine is not warmed up.

7. The method according to claim 1, Wherein the determining of whether to drive in the first mode or the second mode includes:
    determining to drive in the first mode when the predicted travel distance is greater than a predetermined value and the engine is not warmed up; and
    performing warmup control of the engine.

8. The method according to claim 1, wherein the determining of whether to drive in the first mode or the second mode includes:
    determining to drive in the first mode without warmup control of the engine when the engine is warmed up.

9. The method according to claim 1, wherein the first mode includes a charge depleting (CD) mode, and
    the second mode includes a charge sustaining (CS) mode.

10. A computer-readable recording medium recording a program for executing the method of changing the operation mode according to claim 1.

11. A vehicle comprising:
    an engine; and
    a controller configured to determine a predicted travel distance in a first mode and whether the engine is warmed up when a current operation mode is the first mode or a current driving load satisfies a criterion for switching to the first mode, to determine whether to drive in the first mode or a second mode according to the determined predicted travel distance and whether the engine is warmed up, and to control the vehicle to drive in the first mode or the second mode based on the determined predicted travel distance and on determination of whether the engine is warmed up.

12. The vehicle according to claim 11, wherein the current driving load is determined through at least one of a speed of the vehicle, a required torque, and a load level.

13. The vehicle according to claim 11, wherein the predicted travel distance is determined through at least one of a type of a front road, a length of the front road, a gradient of the front road, and congestion information.

14. The vehicle according to claim 11, wherein whether the engine is warmed up is determined using a catalyst temperature of an exhaust gas catalytic converter.

15. The vehicle according to claim 14, wherein the catalyst temperature is determined using at least one of a temperature of a coolant, a speed of the vehicle, and an elapsed time since the engine stops.

16. The vehicle according to claim 11, wherein the controller is configured to determine to drive in the second mode when the predicted travel distance is less than a predetermined value and the engine is not warmed up.

17. The vehicle according to claim 11, wherein the controller is configured to determine to drive in the first mode and is configured to perform warmup control of the engine when the predicted travel distance is greater than a predetermined value and the engine is not warmed up.

18. The vehicle according to claim 11, wherein the controller is configured to determine to drive in the first mode without warmup control of the engine when the engine is warmed up.

19. The vehicle according to claim 11, wherein the first mode includes a charge depleting (CD) mode, and
the second mode includes a charge sustaining (CS) mode.

* * * * *